US009866132B2

(12) United States Patent
Ishigaki

(10) Patent No.: US 9,866,132 B2
(45) Date of Patent: *Jan. 9, 2018

(54) DC-DC POWER CONVERSION AND BALANCING CIRCUIT

(71) Applicant: TOYOTA MOTOR ENGINEERING & MANUFACTURING NORTH AMERICA, INC., Erlanger, KY (US)

(72) Inventor: Masanori Ishigaki, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 222 days.

This patent is subject to a terminal disclaimer.

(21) Appl. No.: 14/815,754

(22) Filed: Jul. 31, 2015

(65) Prior Publication Data

US 2017/0033700 A1 Feb. 2, 2017

(51) Int. Cl.
*H02M 3/335* (2006.01)
*H02J 7/00* (2006.01)

(52) U.S. Cl.
CPC ....... *H02M 3/33584* (2013.01); *H02J 7/0014* (2013.01); *H02J 7/0016* (2013.01)

(58) Field of Classification Search
CPC ................. H02M 3/005; H02M 3/285; H02M 2001/0048; H02M 2001/0058
See application file for complete search history.

(56) References Cited

U.S. PATENT DOCUMENTS 5,684,678 A * 11/1997 Barrett .................... H01F 21/08 363/17
6,490,181 B1 * 12/2002 Liu ......................... B29C 45/76 363/40

(Continued)

FOREIGN PATENT DOCUMENTS

JP 2013-005677 1/2013

OTHER PUBLICATIONS

Federico Baronti et al., "Design and Safety Verification of a Distributed Charge Equalizer for Modular Li-ion Batteries," IEEE Transactions on Industrial Informatics, 2014, 10 Pages.

(Continued)

*Primary Examiner* — Yusef Ahmed
(74) *Attorney, Agent, or Firm* — Oblon, McClelland, Maier & Neustadt, L.L.P.

(57) ABSTRACT

A system includes DC-DC power conversion circuitry having a first switch and a second switch on either side of a first transformer with a first pair of capacitors and a second pair of capacitors cross-connected across the transformer. Balancing circuitry includes a primary side of a second transformer connected between the first pair of capacitors and the second pair of capacitors of the DC-DC power conversion circuitry. Control circuitry is configured to determine a direction of power transfer through the DC-DC power conversion circuitry, align a primary side and a secondary side of the DC-DC power conversion circuitry based on the determined direction of power transfer, align the balancing circuitry to perform balanced or unbalanced operations, and control switching of the first switch and the second switch.

20 Claims, 12 Drawing Sheets

(56) References Cited

U.S. PATENT DOCUMENTS 6,873,134 B2 3/2005 Canter et al.
7,046,532 B2 * 5/2006 Matsuo ................ H02M 3/285 363/17
7,701,182 B2 * 4/2010 Yoshida ................ H02M 3/005 323/272
7,876,581 B2 * 1/2011 Kim ........................ H01F 27/38 363/16
8,670,250 B2 * 3/2014 Fu ........................... H02M 3/28 363/39
8,779,700 B1 7/2014 Prodic et al.
9,502,987 B1 * 11/2016 Feno ................ H02M 3/33546
9,627,979 B2 * 4/2017 Safaee ............. H02M 3/33507
2003/0090269 A1 * 5/2003 Fanini ...................... G01V 3/28 324/339
2003/0142513 A1 * 7/2003 Vinciarelli .............. H02J 1/102 363/17
2003/0227280 A1 * 12/2003 Vinciarelli ............ H02M 1/088 323/265
2004/0145439 A1 * 7/2004 Grilo ....................... H01F 19/08 336/145
2005/0017682 A1 * 1/2005 Canter .................. H02J 7/0021 320/118
2005/0270812 A1 * 12/2005 Vinciarelli ............ H02M 3/157 363/65
2010/0141220 A1 * 6/2010 Abe .................. H02M 3/33569 320/167
2011/0115436 A1 * 5/2011 Zhang ................. B60L 11/1861 320/134
2012/0194133 A1 * 8/2012 Posamentier ......... H02J 7/0018 320/116
2013/0076310 A1 * 3/2013 Garnier ................. H02J 7/0016 320/118
2013/0214607 A1 * 8/2013 Harrison ............... H02M 3/335 307/82
2013/0300210 A1 * 11/2013 Hosotani ................. H02J 5/005 307/104
2014/0049990 A1 * 2/2014 Limpaecher ............ H02M 3/24 363/15
2015/0326132 A1 * 11/2015 Herbert ............. H02M 3/33546 363/21.04
2016/0099646 A1 * 4/2016 Safaee .............. H02M 3/33507 363/17
2016/0099651 A1 * 4/2016 Ishigaki ............ H02M 3/33584 363/21.05
2016/0282832 A1 * 9/2016 Ishigaki .................... H02J 3/18
2017/0085187 A1 * 3/2017 Ishigaki .................. H02M 1/08

OTHER PUBLICATIONS

Infineon, "Active Charge Balancing for Li-ion Battery Stacks," Power Electronics Europe, Issue 3, 2008, pp. 25-27.

* cited by examiner 120
102
104
124
114
122
123
112
108
106
110

100
102
114
104
112
108
106
110

DC-DC POWER CONVERSION AND BALANCING CIRCUIT

CROSS-REFERENCE TO RELATED PATENT APPLICATIONS

The present application incorporates by reference the entire contents of U.S. patent application Ser. No. 14/504,125 having common inventorship with the present application and filed in the U.S. Patent and Trademark Office on Oct. 1, 2014 and U.S. patent application Ser. No. 14/670,138 having common inventorship with the present application and filed in the U.S. Patent and Trademark Office on Mar. 26, 2015.

BACKGROUND

A DC-DC converter with integrated balancing circuitry can conduct bi-directional power transfer and cell balancing operations. U.S. Pat. No. 6,873,134 entitled "Autonomous Battery Cell Balancing System with Integrated Voltage Monitoring" by Canter et al. describes an automated lithium-ion cell balancing system that provides for bilaterally transferring energy from highly charged lithium-ion cells to less charged lithium-ion cells.

SUMMARY

In an exemplary implementation, a system can include: DC-DC power conversion circuitry including a first switch and a second switch on either side of a first transformer with a first pair of capacitors and a second pair of capacitors cross-connected across the transformer. Balancing circuitry can include a primary side of a second transformer connected between the first pair of capacitors and the second pair of capacitors of the DC-DC power conversion circuitry. Control circuitry can: determine a direction of power transfer through the DC-DC power conversion circuitry, align a primary side and a secondary side of the DC-DC power conversion circuitry based on the determined direction of power transfer, align the balancing circuitry to perform balanced or unbalanced operations, and control switching of the first switch and the second switch.

The DC-DC power conversion circuitry can perform bi-directional power transfer. The system can determine the direction of power transfer by selecting the first switch or the second switch to cycle on and off.

A secondary side of the second transformer can include one or more taps connected to one or more source cells. The one or more source cells can be connected to the one or more taps of the second transformer via a diode. The one or more source cells can be battery cells. The balancing circuitry can balance states of charge (SOCs) of one or more source cells having unequal voltages.

The second transformer can be activated by an alternating voltage produced between the first pair of capacitors and the second pair of capacitors as power is transferred between a primary side and a secondary side of the DC-DC power conversion circuitry.

The balancing circuitry can include a third switch connecting the balancing circuitry to the DC-DC power conversion circuitry. The control circuitry can align the balancing circuitry for balanced operations by issuing a control signal to close the third switch. The control circuitry can also align the balancing circuitry for unbalanced operations by issuing a control signal to open the third switch.

The control circuitry can align the balancing circuitry for balanced operations when a difference in voltage between one or more source cells is greater than a predetermined threshold.

The control circuitry can align the balancing circuitry for balanced operations when a voltage of one or more source cells is at least one of less than a lower threshold or greater than an upper threshold.

The balancing circuitry can perform cell balancing operations during charging and discharging of one or more source cells.

The second transformer of the balancing circuitry can have a higher excitation impedance than a total excitation impedance of the first transformer, the first capacitor pair, and the second capacitor pair of the DC-DC power conversion circuitry.

The DC-DC power conversion circuitry can have higher rates of energy transfer than the balancing circuitry. The balancing circuitry can be configured to provide no interference to operations of the DC-DC power conversion circuitry.

In another exemplary implementation, a process can include: determining a direction of power transfer through DC-DC power conversion circuitry including a first switch and a second switch on either side of a first transformer with a first pair of capacitors and a second pair of capacitors cross-connected across the transformer; aligning a primary side and a secondary side of the DC-DC power conversion circuitry based on the determined direction of power transfer; aligning balancing circuitry including a primary side of a second transformer connected between the first pair of capacitors and the second pair of capacitors of the DC-DC power conversion circuitry to perform balanced or unbalanced operations; and controlling switching of the first switch and a the second switch. A non-transitory computer-readable storage medium including executable instructions, which when executed by circuitry, can cause the circuitry to perform the process.

A further exemplary implementation can include control circuitry that can: determine a direction of power transfer through DC-DC power conversion circuitry including a first switch and a second switch on either side of a first transformer with a first pair of capacitors and a second pair of capacitors cross-connected across the transformer, align a primary side and a secondary side of the DC-DC power conversion circuitry based on the determined direction of power transfer, align balancing circuitry including a primary side of a second transformer connected between the first pair of capacitors and the second pair of capacitors of the DC-DC power conversion circuitry to perform balanced or unbalanced operations, and control switching of the first switch and the second switch.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figures 1A, 1B:
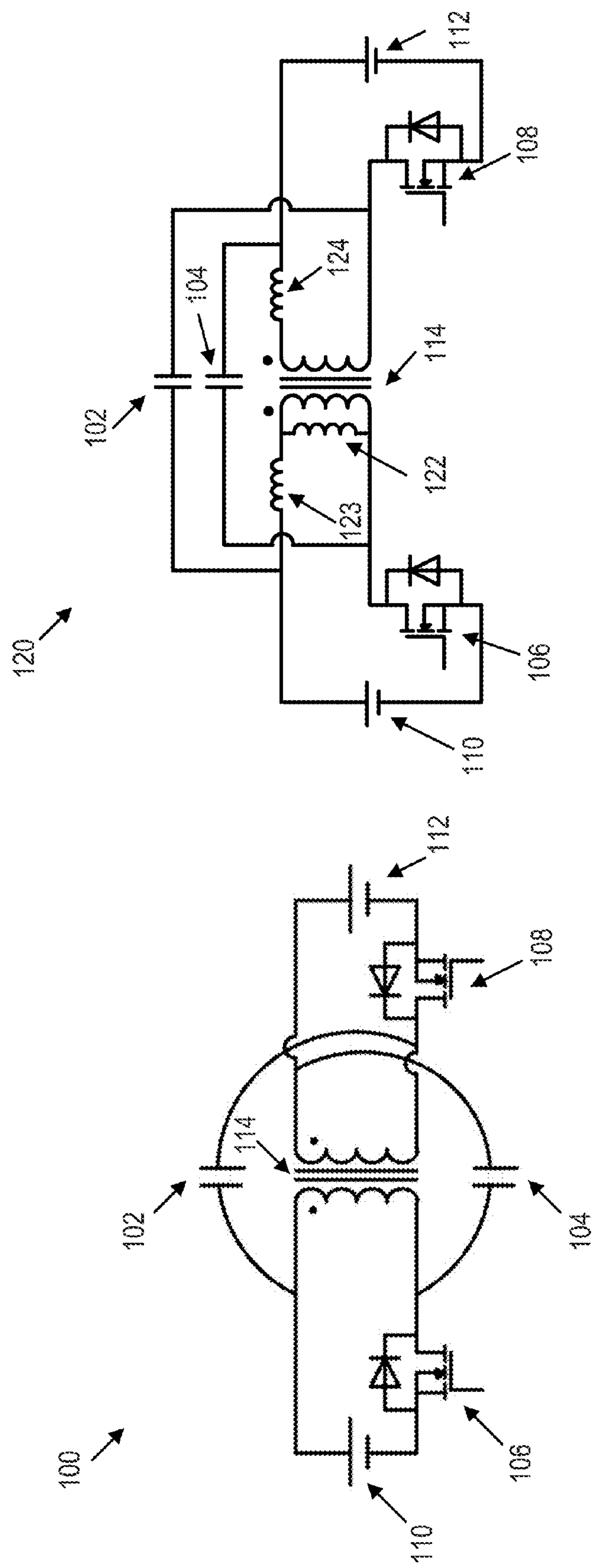
FIG. 1A is an exemplary illustration of an isolated DC-DC power conversion circuit.
FIG. 1B is an exemplary illustration of an isolated DC-DC power conversion circuit.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

FIG. 1A is an exemplary illustration of an isolated DC-DC power conversion circuit 100. The isolated DC-DC power conversion circuit 100 can include a primary side and a secondary side that are symmetrical on either side of a magnetic core transformer 114. In an exemplary implementation, capacitors 102 and 104 can be cross-connected across the magnetic core transformer 114. The primary side can include a primary switch 106 and a primary DC power supply 110, and the secondary side can include a secondary switch 108 and a secondary DC power supply 112. In an implementation, the capacitance values of the cross-connected capacitors 102 and 104 can be equal. The primary switch 106 and the secondary switch 108 can include a MOSFET with a diode connected from the source to the drain of the MOSFET. In some aspects, the turn ratio N of the magnetic core transformer 114 is determined based on the ratio of the voltage of the primary DC power supply 110 to the voltage of the secondary DC power supply 112.

In certain implementations, the isolated DC-DC power conversion circuit 100 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during battery cell balancing.

In order to allow the electrical components to operate as either power sources or electrical loads, the isolated DC-DC power conversion circuit 100 can operate bi-directionally due to the symmetry between the primary and secondary sides. More specifically, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In some implementations, the primary switch 106 and secondary switch 108 are controlled by gate drivers that are integrated into the primary switch 106 and the secondary switch 108.

FIG. 1B is another exemplary illustration of an isolated DC-DC power conversion circuit 120. In addition to the components described with respect to the isolated DC-DC power conversion circuit 100 of FIG. 1A, the isolated DC-DC power conversion circuit 120 can also include an exciting inductor 122 and leakage inductors 123 and 124. In some aspects, the leakage inductor 123 is on the primary side and the leakage inductor 124 is on the secondary side of the isolated DC-DC power conversion circuit 120. In some implementations, the magnetic core transformer 114 can be an ideal transformer, and the exciting inductor 122 and/or the leakage inductors 123 and 124 can illustrate an equivalent circuit for a real transformer. The exciting inductor 122 can be added in parallel with the primary side of the magnetic core transformer 114 in order to account for non-zero reluctance within the magnetic core transformer. In addition, the leakage inductors 123 and 124 can demonstrate how imperfect coupling within the magnetic core transformer 114 can affect the functionality of the isolate DC-DC power conversion circuit 120. In order to provide a more concise description, the isolated DC-DC power conversion circuit 100 and 120 can be used interchangeably throughout the disclosure.

Figure 2B:
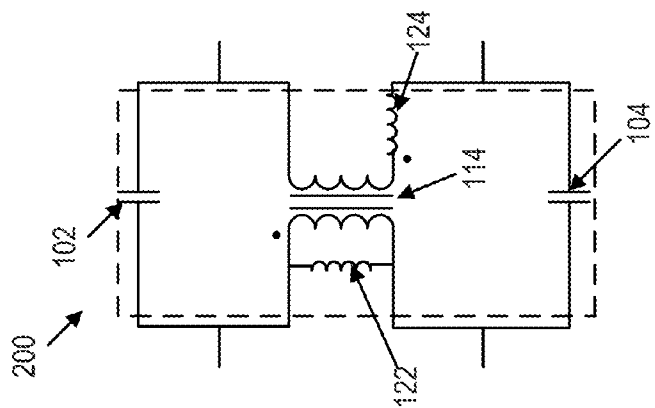
FIG. 2B is an exemplary illustration of an inductor-capacitor (LC) tank of an isolated DC-DC power conversion circuit.
Figure 2A:
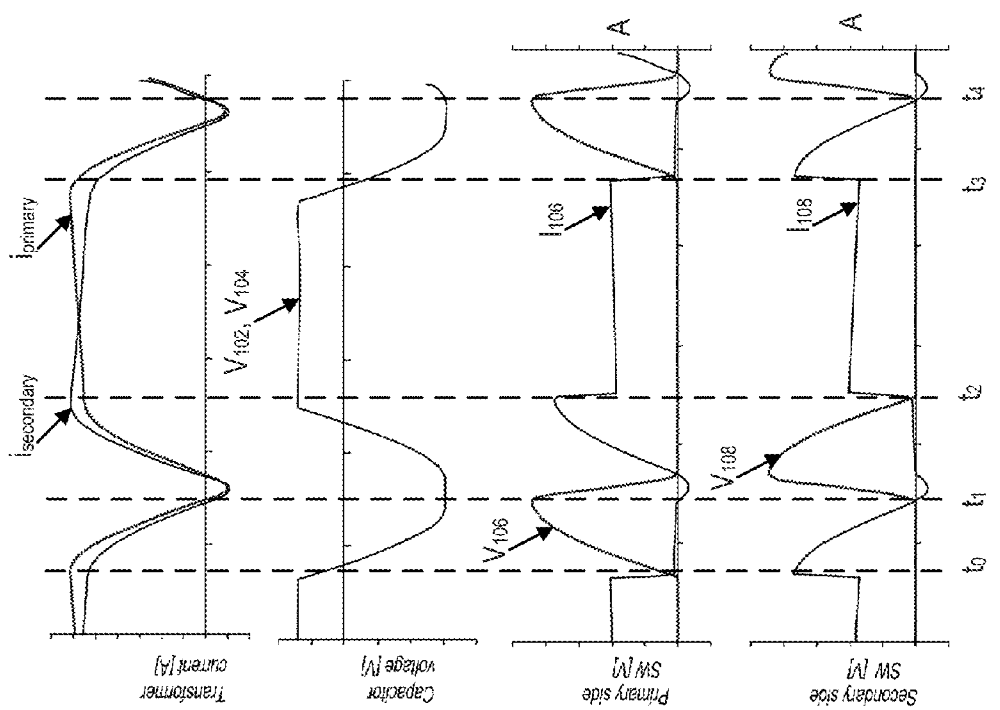
FIG. 2A is an exemplary illustration of current and voltage waveforms for an isolated DC-DC power conversion circuit.

FIG. 2A is an exemplary illustration of current and voltage waveforms for an isolated DC-DC power conversion circuit. For example, the primary switch 106 can be turned on at time t1 and subsequently turned off at time $t_3$, which represents one duty cycle for the primary switch 106. At time $t_4$, another duty cycle can commence. The amount of power transferred from the primary side to the secondary side of the isolated DC-DC power conversion circuit 100 can be modified by changing the duty cycle or the switching frequency of the primary switch 106. For example, to increase the amount of power transferred from the primary side to the secondary side of the isolated DC-DC power conversion circuit 120, the ratio of the amount of time that the primary switch 106 is turned on to the length of the period of the primary switch 106 is increased.

In some implementations, bi-directional power transfer can be performed by transferring power from the secondary side to the primary side of the isolated DC-DC power conversion circuit 120 by cycling the secondary switch 108 on and off. The description of the transfer of power from the secondary side to the primary side of the isolated DC-DC power conversion circuit 120 can also be applied to bi-directional power transfer in a straightforward way to one of ordinary skill in the art.

The duty cycle, switching frequency, and direction of power transfer within the isolated DC-DC power conversion circuit 120 can be controlled by one or more electronic control units (ECUs) or similar circuitry. For example, sensors can be installed within battery cells of an electric vehicle (EV) that can sense battery state of charge (SOC), voltage, and the like. In an implementation, the ECUs can process sensor data, display battery SOC information to a user, and send control signals to actuators that align the isolated DC-DC power conversion circuit 120. The ECUs can control the direction of power transfer as well as the quantity of power transferred by the isolated DC-DC power conversion circuit 120 by controlling the duty cycles and switching frequencies of the primary switch 106 and the secondary switch 108. The ECUs can also align the isolated DC-DC power conversion circuit 120 to perform functions determined by input from a user. Throughout the disclosure the term ECU can be used interchangeably with the terms controller and local controller.

At time $t_0$, the primary switch 106 is turned off upon completion of an on-period. Between times $t_0$ and $t_1$, the primary switch 106 is off, and capacitors 102 and 104 are negatively charged, according to some implementations. The voltage of the capacitors, $V_{102}$ and $V_{104}$ can be at a maximum negative value and no current is flowing through the isolated DC-DC power conversion circuit 120. In addition, the voltage at the primary switch $V_{106}$ can be equal to the voltage of the primary DC power supply 110.

At time $t_1$, the primary switch 106 can be turned on. In some aspects, the primary switch 106 is turned on when the current through the primary switch $I_{106}$ is zero, which is a type of soft switching that can be referred to as zero current switching (ZCS). In some implementations, switching losses can be reduced when turning on the primary switch 106 by implementing ZCS. Between times $t_1$ and $t_2$, the capacitors 102 and 104 discharge energy through the leakage inductors 123 and 124, and LC resonance can occur. The voltage at the capacitors $V_{102}$ and $V_{104}$ can also increase until a maximum voltage is reached, according to some aspects.

In addition, primary and secondary transformer currents $i_{Primary}$ and $i_{Secondary}$ increase in a sinusoidal pattern due to series resonance of the isolated DC-DC power conversion circuit 100 up to time $t_1$. Due to the series resonance, the current through the primary DC power supply 110 and the current through the primary switch $I_{106}$ can increase in a sinusoidal pattern to an approximate maximum value at time $t_2$.

At time $t_2$, the secondary switch 108 diode turns on when the sum of the voltages at the leakage inductors 123 and 124 is equal to the sum of the voltage of the secondary DC power supply 112 and the voltage of the secondary switch 108 diode, which can be explained by the equation, $V_{123}+V_{124}=V_{112}+V_{Diode}$. When the secondary switch 108 diode turns on, the current of capacitors 102 and 104 go to zero, and power is transferred from the primary side to the secondary side of the isolated DC-DC power converter circuit 120 through the magnetic core transformer 114, which is illustrated by the $i_{Primary}$ and $i_{Secondary}$ currents of across the transformer 114. The power transfer through the magnetic core transformer 114 between times $t_2$ and $t_3$ can be referred to as inductive power transfer or magnetic power transfer, according to an implementation. The primary switch current $I_{106}$ and the secondary switch current $I_{108}$ are constant during the inductive power transfer.

At time $t_3$, the primary switch 106 is turned off when the voltage at the primary switch V106 is zero, which can be referred to as zero voltage switching (ZVS). In some implementations, switching losses can be reduced when turning off the primary switch 106 by implementing ZVS. Power can be transferred from the primary side to the secondary side of the isolated DC-DC power converter circuit 120 through capacitors 102 and 104, which can be referred to as capacitive power transfer. Between times $t_3$ and $t_4$, the isolated DC-DC power converter circuit 100 can experience series resonance at a frequency, ω_2, which can be described by the equation, $$\omega_2 = \frac{1}{\sqrt{2\frac{C_{102}}{2}L_{123}}} = N\omega_1.$$

FIG. 2B is an exemplary illustration of an equivalent inductor-capacitor (LC) tank 200 of an isolated DC-DC power conversion circuit 100. The LC tank 200 includes the components that experience resonance during operation of the isolated DC-DC power conversion circuit 120. For example, the LC tank can include capacitors 102 and 104, transformer 114, and leakage inductors 122 and 124. Within the closed loop of the LC tank 200, represented by the dashed line in FIG. 2B, the average capacitor voltage is equal to zero. According to some implementations, the LC tank 200 can be modified to provide connection points for balancing circuitry that can be integrated with the isolated DC-DC power conversion circuit 120. Details regarding the balancing circuitry are discussed further herein.

Figure 3B:
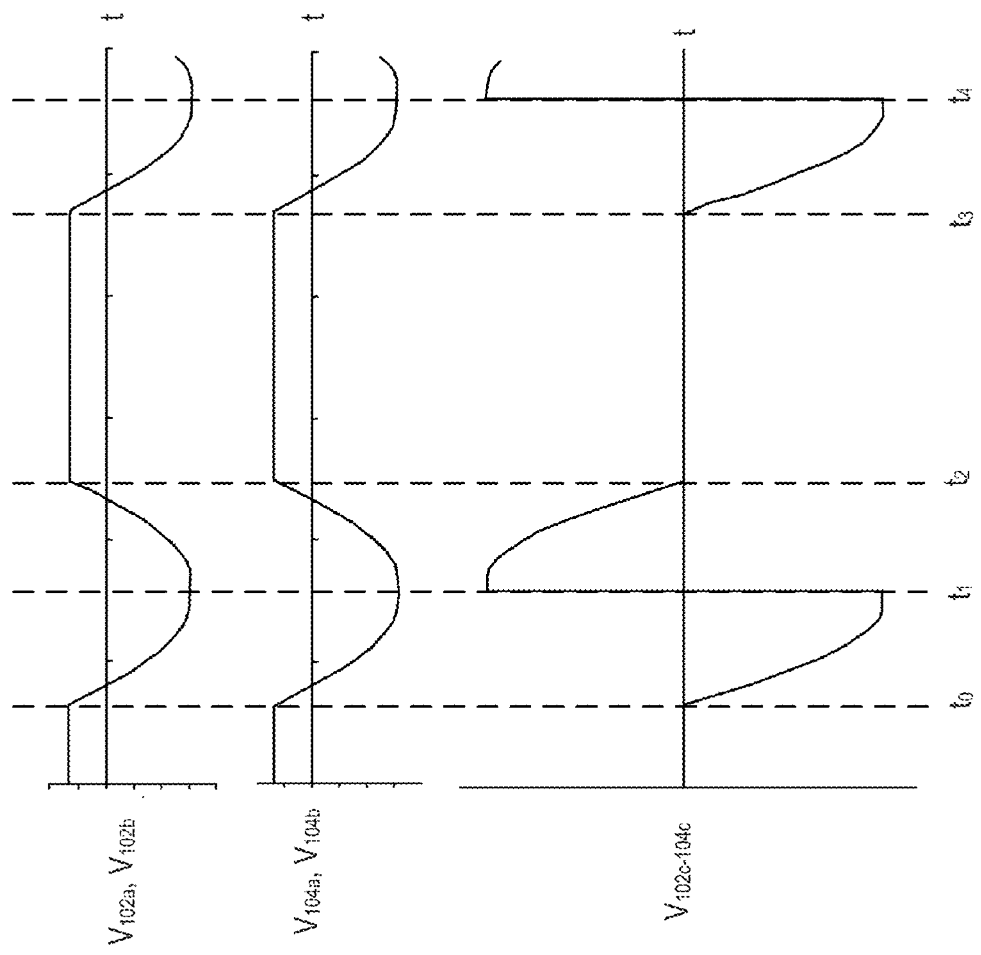
FIG. 3B is an exemplary illustration of voltage waveforms for an LC tank.
Figure 3A:
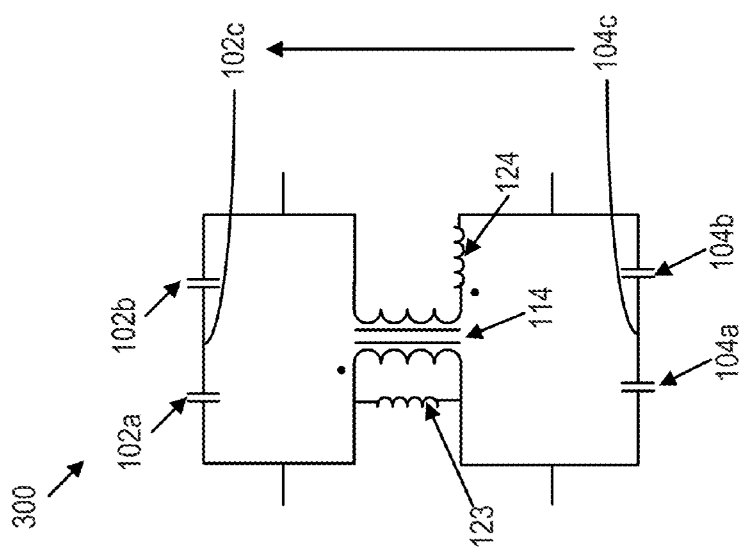
FIG. 3A is an exemplary illustration of an LC tank of an isolated DC-DC power conversion circuit.

FIG. 3A is an exemplary illustration of an LC tank 300 of an exemplary isolated DC-DC power conversion circuit. The LC tank 300 is an implementation of the LC 200 where the capacitor 102 is split into capacitor pair 102*a*/102*b*, and the capacitor 104 is split into capacitor pair 104*a*/104*b*. In some implementations, the capacitance values of the capacitors 102*a* and 102*b* can be double the capacitance of capacitor 102 so that the total series capacitance of capacitors 102*a* and 102*b* is equal to the capacitance of capacitor 102. Also, the capacitance values of the capacitors 104*a* and 104*b* can be double the capacitance of capacitor 104 so that the total series capacitance of capacitors 104*a* and 104*b* is equal to the capacitance of capacitor 104. By designing the series capacitance of capacitor pairs 102*a*/102*b* and 104*a*/104*b* to be equal to capacitors 102 and 104, respectively, the LC tank 300 can retain a functionality that corresponds to the LC tank 200. In some implementations, a voltage is taken across points 102*c* and 104*c*, where point 102*c* is in between capacitors 102*a* and 102*b*, and point 104*c* is in between capacitors 104*a* and 104*b*.

FIG. 3B is an exemplary illustration of voltage waveforms for an LC tank 300. The first two graphs illustrate the voltages of capacitors pairs 102*a*/102*b* and 104*a*/104*b* during operation of an isolated DC-DC power conversion circuit that includes components corresponding to the LC tank 300. The primary switch 106 can be turned off at time $t_0$ after completion of a duty cycle. The primary switch 106 can be turned on at time $t_1$ and off at time $t_3$ to perform one duty cycle, and at time $t_4$, the primary switch 106 can be turned on again. Just as with the voltage of the capacitors 102 and 104 in the isolated DC-DC power conversion circuit 100, when the primary switch is turned on at time $t_1$, the voltages of capacitors 102_a_, 102_b_, 104_a_, and 104_b_ increase until an approximate maximum is reached at time $t_1$. The capacitor voltages $V_{102a}$, $V_{102b}$, $V_{104a}$, and $V_{104b}$, remain constant between times $t_2$ and $t_3$ when power is transferred from the primary side to the secondary side of the isolated DC-DC power conversion circuit. Between times $t_3$ and $t_4$, the capacitor voltages decrease as capacitive power transfer occurs from the primary side to the secondary side of the isolated DC-DC power conversion circuit.

FIG. 3B also includes an exemplary graph of the voltage between points 102_c_ and 104_c_ ($V_{102C\text{-}104C}$) of the LC tank 300 during operation of an isolated DC-DC power conversion circuit. As the primary switch of the isolated DC-DC power conversion circuit is turned on and off, the voltage between points 102_c_ and 104_c_ alternates with respect to time such that the average voltage for one duty cycle is equal to zero. In some implementations, balancing circuitry can be connected to the LC tank 300 at points 102_c_ and 104_c_, and a balancing transformer of the balancing circuitry can be driven by the alternating voltage between points 102_c_ and 104_c_. Details regarding the integration of the cell balancing circuit into the isolated DC-DC power conversion circuit are discussed further herein.

Figure 4:
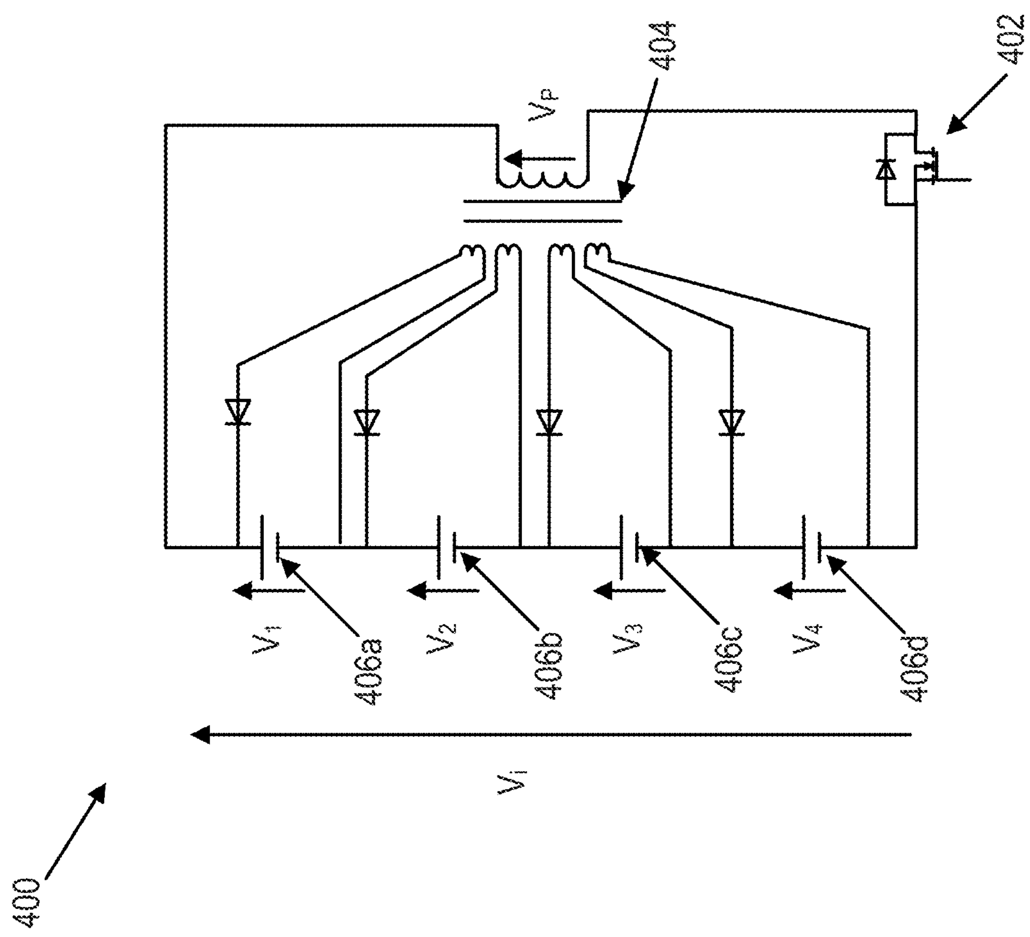
FIG. 4 is an exemplary illustration of a prior art cell balancing circuit.

FIG. 4 is an exemplary illustration of a prior art balancing circuit 400. According to some implementations, the balancing circuit 400 can include a balancing transformer 404, a switch 402, and one or more battery cells 406_a_, 406_b_, 406_c_, and 406_d_ that are connected to the secondary side of the balancing transformer 404. The number of battery cells connected to the balancing transformer 404 can be based on the number of battery cells in an energy module that provides power to one or more electrical loads, such as a battery pack in an electric vehicle (EV). The individual voltages $V_1$, $V_2$, $V_3$, and $V_4$ of each of the battery cells 406_a_, 406_b_, 406_c_, and 406_d_ add up to a total voltage $V_i$ on the secondary side of the balancing transformer 404. The voltages V1, V2, V3, and V4 are based on the state of charge (SOC) of the battery cells and may not be equal in some implementations.

The battery cells 406_a_, 406_b_, 406_c_, and 406_d_ can be connected in series, and the primary side of the balancing transformer 404 can be connected to the end terminals of the series-connected battery cells. For example, the primary side of the balancing transformer 404 is driven by the total voltage $V_i$, which is the sum of the individual battery cell voltages $V_1$, $V_2$, $V_3$, and $V_4$. In addition, the secondary side of the balancing transformer 404 can have uniformly tapped windings so that battery cells having a SOC that is lower than the other battery cells that are connected to the balancing transformer 404 are charged preferentially by the primary side of the balancing transformer 404.

According to some implementations, the primary side of the balancing transformer 404 produces a pulse voltage, $V_P$, in response to the operation of the switch 402. For example, when the switch 402 is turned on (closed), the primary side of the balancing transformer 402 is charged by the battery cells 406_a_, 406_b_, 406_c_, and 406_d_ that are connected in series. When the switch is turned off (opened), the stored energy, $V_P$, in the balancing transformer 404 is transferred to battery cells 406_a_, 406_b_, 406_c_, and 406_d_, and the one or more battery cells with the lowest voltage and SOC are charged preferentially so that the battery cells maintain a balanced SOC.

Figure 5:
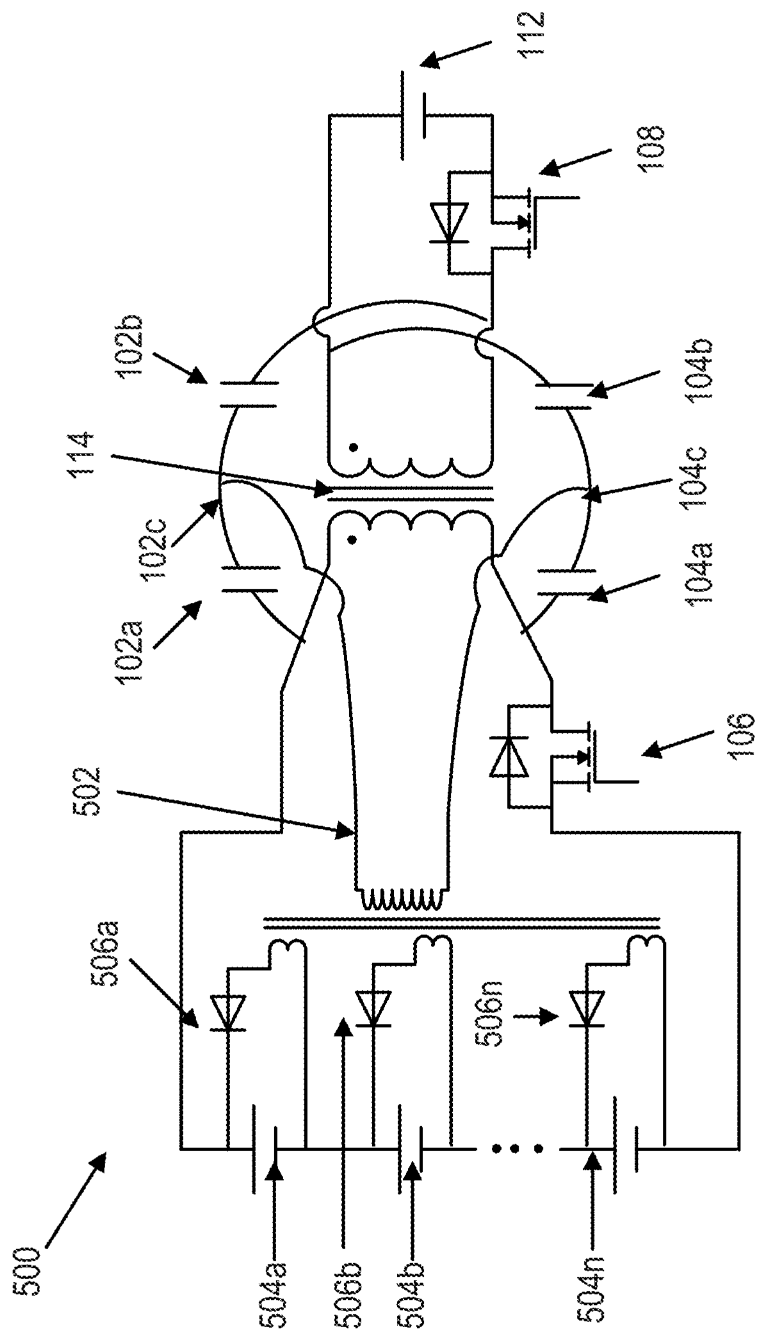
FIG. 5 is an exemplary illustration of an integrated DC-DC power conversion and cell balancing circuit.

FIG. 5 is an exemplary illustration of an integrated DC-DC power conversion and cell balancing circuit 500. For purposes simplicity of description, the integrated DC-DC power conversion and cell balancing circuit 500 is interchangeably referred to as the DC-DC cell balancing converter 500. The DC-DC cell balancing converter 500 can include a primary side and a secondary side with capacitor pairs 102_a_/102_b_ and 104_a_/104_b_ that can be cross-connected across the magnetic core transformer 114. In an implementation, the series capacitance values of the cross-connected capacitors 102_a_/102_b_ and 104_a_/104_b_ can be equal. The secondary side can include a secondary switch 108 and a secondary DC power supply 112, and the primary side includes primary switch 106 and battery cells 504_a_, 504_b_, and up to 504_n_, where n represents a total number of battery cells in an energy module that are connected to the DC-DC cell balancing converter 500. In some implementations, the battery cells 504_a_, 504_b_, through 504_n_ are included as source cells of an energy module that provides power to loads of an EV. The primary switch 106 and the secondary switch 108 can include a MOSFET with a diode connected from the source to the drain of the MOSFET. In some aspects, the turn ratio N of the magnetic core transformer 114 is determined based on the ratio of the voltage of the primary DC power supply 110 to the voltage of the secondary DC power supply 112.

The balancing circuitry can be connected on the primary side of the DC-DC cell balancing converter 500, according to one implementation. The balancing circuitry can also be connected to the secondary side of the DC-DC cell balancing converter 500. The primary side of the balancing transformer 502 can be connected at point 102_c_ between capacitors 102_a_ and 102_b_ and at point 104_c_, which is between the capacitors 104_a_ and 104_b_. The secondary side of the balancing transformer 502 has multi-tapped windings such that each tap is connected to the battery cells 504_a_ through 504_n_ via diodes 506_a_, 506_b_, through 506_n_. Throughout the disclosure, references to the balancing circuitry include the components of the DC-DC cell balancing converter 500 associated with cell balancing, such as the balancing transformer 502, diodes 506_a_, 506_b_, through 506_n_ that connect the battery cells 504_a_ through 504_n_ to the secondary side of the balancing transformer 502, and other associated electrical connections. In addition, references to DC-DC power conversion circuitry refer to components of the DC-DC cell balancing converter 500 associated with transferring power between the primary side and the secondary side of the DC-DC cell balancing converter 500.

As described previously with respect to the LC tank 300, as the primary switch 106 turns on and off during to transfer power from the primary side to the secondary side of the DC-DC cell balancing converter 500, an alternating voltage between points 102_c_ and 104_c_ is produced, which drives the operation of the balancing transformer 502. The balancing circuit 400 described previously included a dedicated switch 402 for driving the operation of the balancing transformer 404. On the other hand, with respect to the DC-DC cell balancing converter 500, the balancing transformer 502 is driven by the alternating voltage between points 102_c_ and 104_c_ so that the DC-DC cell balancing converter 500 does not include a dedicated switch for driving cell balancing operations, according to some implementations. Also, by connecting the primary side of the balancing transformer 502 at points 102_c_ and 104_c_, the balancing circuitry does not interfere with performance of DC-DC power conversion, according to some implementations.

In order to allow the electrical components to operate as either power sources or electrical loads, the DC-DC cell balancing converter 500 can operate bi-directionally. More specifically, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In some implementations, the primary switch 106 and secondary switch 108 are controlled by gate drivers that are integrated into the primary switch 106 and the secondary switch 108.

As power is transferred from the primary side to the secondary side of the DC-DC cell balancing converter 500, the integrated balancing circuitry ensures that the discharge of energy from the battery cells 504*a* through 504*n* is balanced so that the charge and discharge rates of the individual cells are based on maintaining cell voltages that are approximately equal. As power is transferred from the secondary side to the primary side of the DC-DC cell balancing converter 500, such as during cell charging operations, the balancing circuitry allows for balanced charging of the battery cells 504*a* to 504*n*. Details regarding battery cell charging and discharging operations are discussed further herein.

According to some implementations, the excitation impedance of the balancing transformer 502 is greater than a total excitation impedance of the magnetic core transformer 114 and cross-connected capacitor pairs 102*a*/102*b* and 104*a*/104*b*. During operations of the DC-DC cell balancing converter 500, balancing operations performed by the balancing circuitry during battery cell charging and/or discharging can occur over a longer time period than DC-DC power transfer between the primary and secondary sides of the DC-DC cell balancing converter 500. For example, balancing of the battery cells 504*a* to 504*n* can occur over a period of one or more hours, and can include quantities of energy transfer in an inclusive range of 1 W to 10 W and including 1 Watt (W), 2 W, 5 W, 10 W, or any greater or smaller amount of energy. In one implementation, power transfer between the primary and secondary sides of the DC-DC cell balancing converter 500 involves higher rates of energy transfer where quantities of energy in an inclusive range from 100 W to 1000 W can be transferred from the primary side to the secondary side of the DC-DC cell balancing converter 500 in time periods of less than one hour, such as any time period in the range from less than one minute to less than one hour. The DC-DC cell balancing converter 500 can also implement higher or lower rates of energy transfer for battery balancing and/or DC-DC power transfer than those described herein.

Figure 6A:
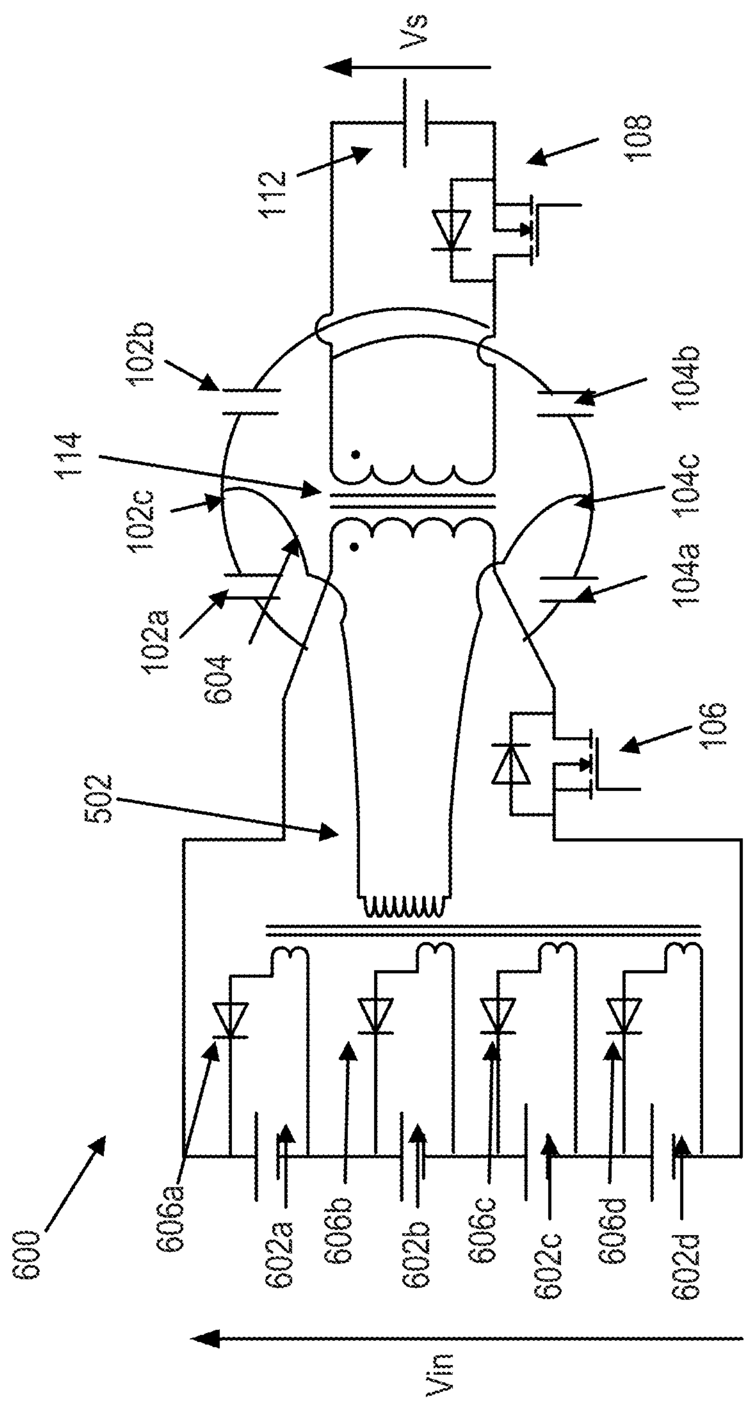
FIG. 6A is an exemplary illustration of an integrated DC-DC power conversion and cell balancing circuit.

FIG. 6A is an exemplary illustration of an integrated DC-DC power conversion and cell balancing circuit 600. The DC-DC cell balancing converter 600 is an exemplary implementation of the DC-DC cell balancing converter 500. The DC-DC cell balancing converter 600 includes four battery cells 602*a*, 602*b*, 602*c*, and 602*d* in series that are connected to the secondary side of the balancing transformer 502 via diodes 606*a*, 606*b*, 606*c*, and 606*d*, as well as the balancing circuitry components and DC-DC power conversion circuitry described previously with respect to the DC-DC cell balancing converter 500. The battery cells 602*a*, 602*b*, 602*c*, and 602*d* have individual voltages add up to a total voltage of $V_{in}$ on the primary side of the DC-DC cell balancing converter 600. The voltage of the secondary DC power supply 112 is shown as $V_S$, and the voltage on the primary side of the balancing transformer 502 is shown as $V_r$.

The DC-DC cell balancing converter 600 also includes switch 604 that can connect and disconnect the balancing circuitry from the DC-DC cell balancing converter 600 in response to a control signal issued from the control circuitry of the at least one ECU. For example, the switch 604 can be closed during balanced operations and open during unbalanced operations. In some aspects, the control circuitry can issue a control circuitry to close the switch 604 to perform cell balancing operations when a difference between the voltages of the battery cells 602*a*, 602*b*, 602*c*, and 602*d* is greater than a predetermined threshold. In addition, when the difference between the voltages of the battery cells 602*a*, 602*b*, 602*c*, and 602*d* is less than a predetermined threshold, the control circuitry can issue a control signal to open the switch 604.

In addition, the control circuitry can issue the control signals to open and/or close the switch 604 based on an allowed maximum or minimum voltage for the battery cells 602*a*, 602*b*, 602*c*, and 602*d*. For example, achieving predetermined performance characteristics and operational lifetime of some types of battery cells, such as lithium-ion (Li-ion) battery cells, can be based on maintaining the battery cell voltage between the allowed minimum and maximum voltage values. If the battery cells 602*a*, 602*b*, 602*c*, and 602*d* are aligned for unbalanced operation when power is being transferred from the primary side to the secondary side of the DC-DC cell balancing converter 600, the battery cell with a lowest initial OCV may dip below the allowed minimum voltage even though the average battery cell voltage is greater than the allowed minimum voltage. Aligning the battery cells 602*a*, 602*b*, 602*c*, and 602*d* for balanced operation can assist in maintaining all of the battery cells between the allowed minimum and maximum voltages. If the control circuitry, based outputs from one or more voltage sensor devices, determines that the voltage of a cell is less than a lower threshold or greater than an upper threshold, a control signal can be issued to close the switch 604 to align the DC-DC cell balancing converter for balanced operations.

Figure 6B:
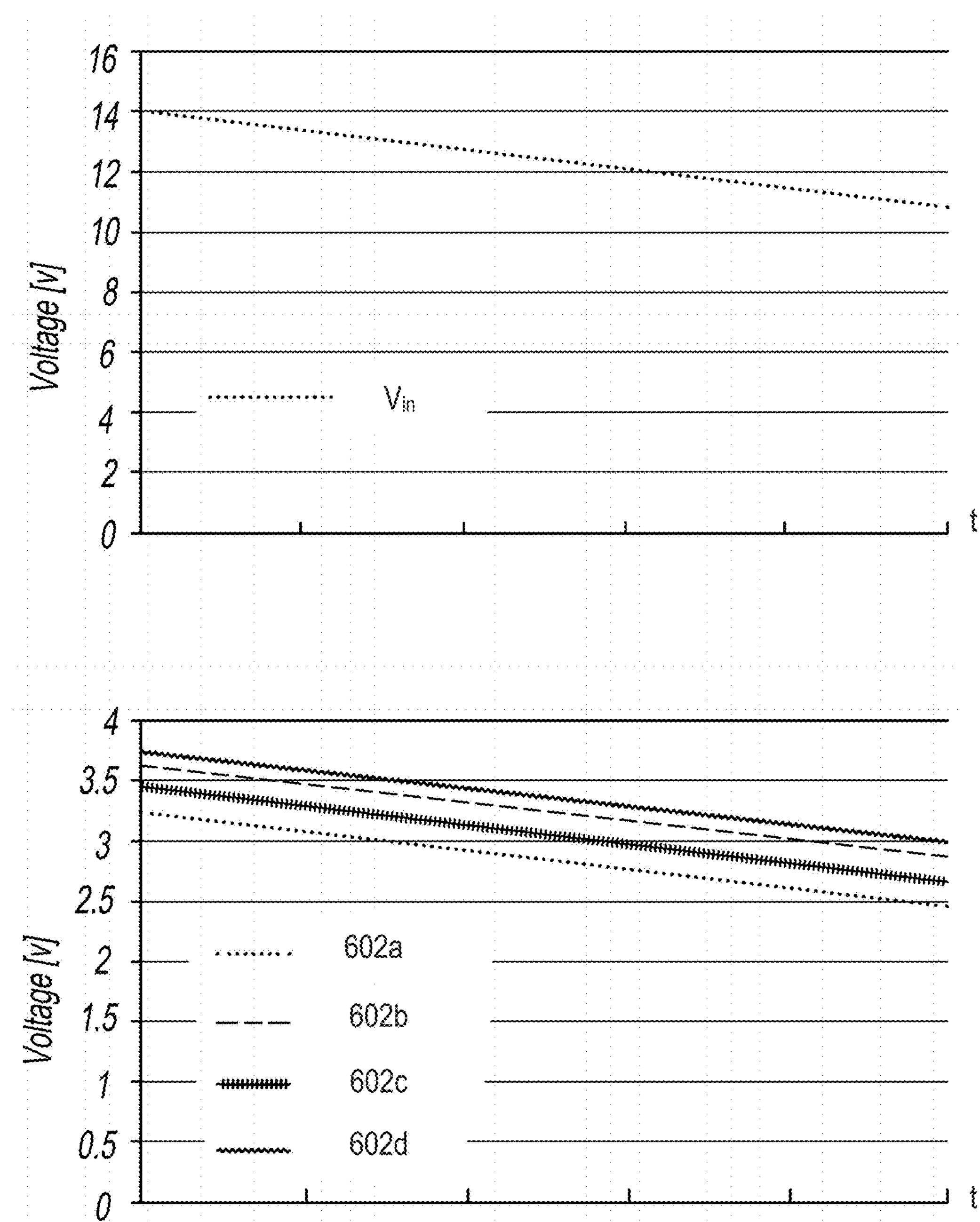
FIG. 6B is an exemplary illustration of unbalanced operations of an integrated DC-DC power conversion and cell balancing circuit.

FIG. 6B is an exemplary illustration of simulation results unbalanced operations of an integrated DC-DC power conversion and cell balancing circuit 600. According to one implementation, the switch 604 is open during the unbalanced operations where power is transferred from the primary side to the secondary side of the DC-DC cell balancing converter 600. In one implementation, the battery cells 602*a*, 602*b*, 602*c*, and 602*d* have unequal initial open circuit voltages (OCVs). For example, battery cell 602*a* can have an initial OCV of 3.2 V, battery cell 602*b* can have an initial OCV of 3.6 V, battery cell 602*c* can have an initial OCV of 3.4 V, and battery cell 602*d* can have an initial OCV of 3.7 V. As such, the total initial voltage ($V_{in}$) for the primary side of the DC-DC cell balancing converter 600 is 14 V. As power is transferred from the primary side to the secondary side of the DC-DC cell balancing converter 600, the battery cells are discharged at a constant rate over time such that the total voltage on the primary side is reduced to 11V, and the battery cell voltages remain unequal, which can also be referred to as unbalanced.

Figure 6C:
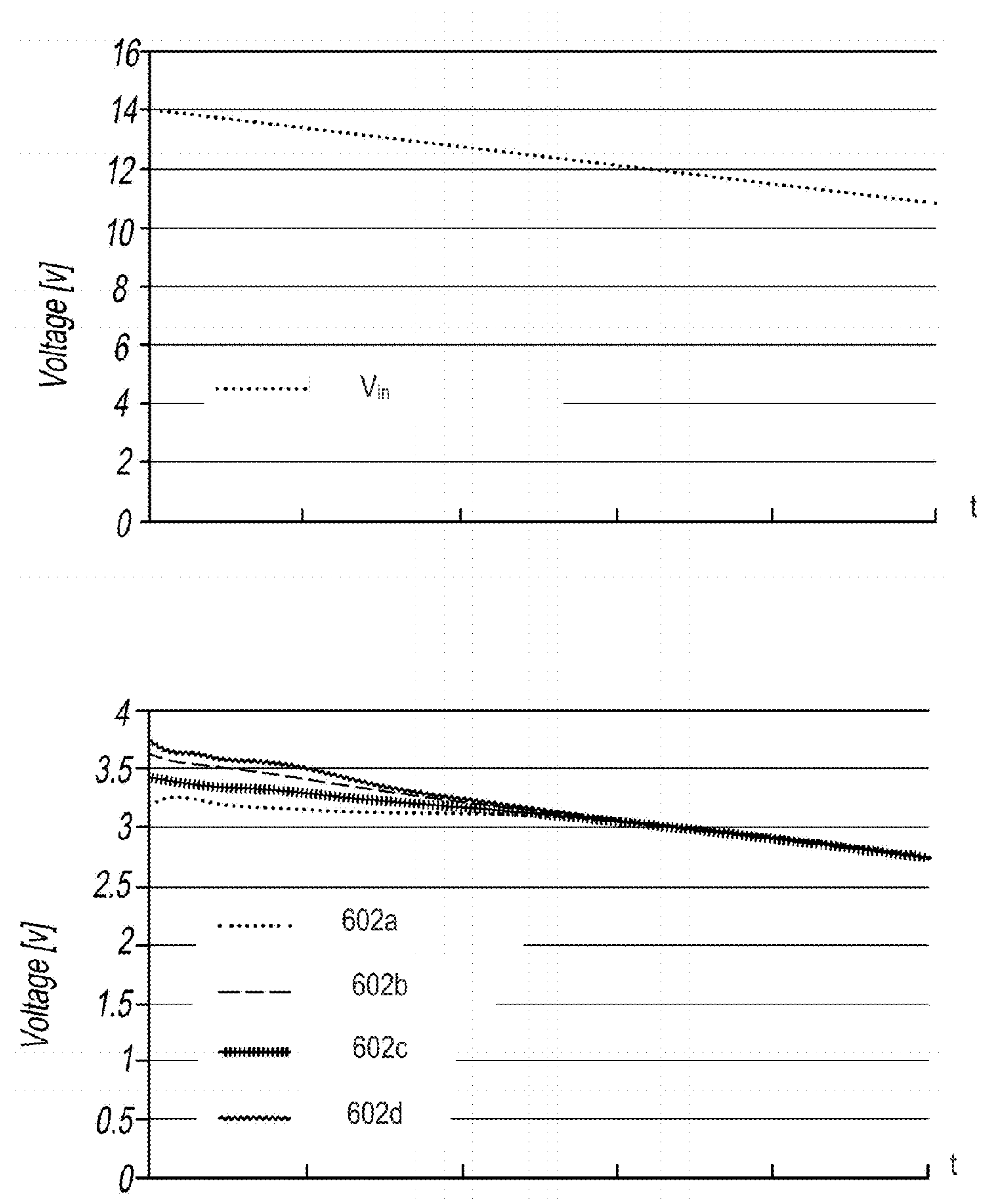
FIG. 6C is an exemplary illustration of unbalanced operations of an integrated DC-DC power conversion and cell balancing circuit.

FIG. 6C is an exemplary illustration of unbalanced operations of an integrated DC-DC power conversion and cell balancing circuit 600. According to one implementation, the switch 604 is closed during the balanced operations where power is transferred from the primary side to the secondary side of the DC-DC cell balancing converter 600. In one implementation, the battery cells 602*a*, 602*b*, 602*c*, and 602*d* have unequal initial open circuit voltages (OCVs) as described with respect to FIG. 6B, and the total initial voltage ($V_{in}$) for the primary side of the DC-DC cell balancing converter 600 is 14 V. As power is transferred from the primary side to the secondary side of the DC-DC cell balancing converter 600, the balancing circuitry causes the battery cells 602*a*, 602*b*, 602*c*, and 602*d* to discharge at rates based on the individual battery cell voltages. For example, battery cells having a higher voltage have a higher discharge rate than battery cells having a lower voltage such that the individual battery voltages reach an approximately equal value during balanced cell balancing operations. For example, the final voltage for the battery cells 602*a*, 602*b*, 602*c*, and 602*d* is approximately 2.75 V which equals a total of approximately 11 V after balanced discharging operations.

Figure 7:
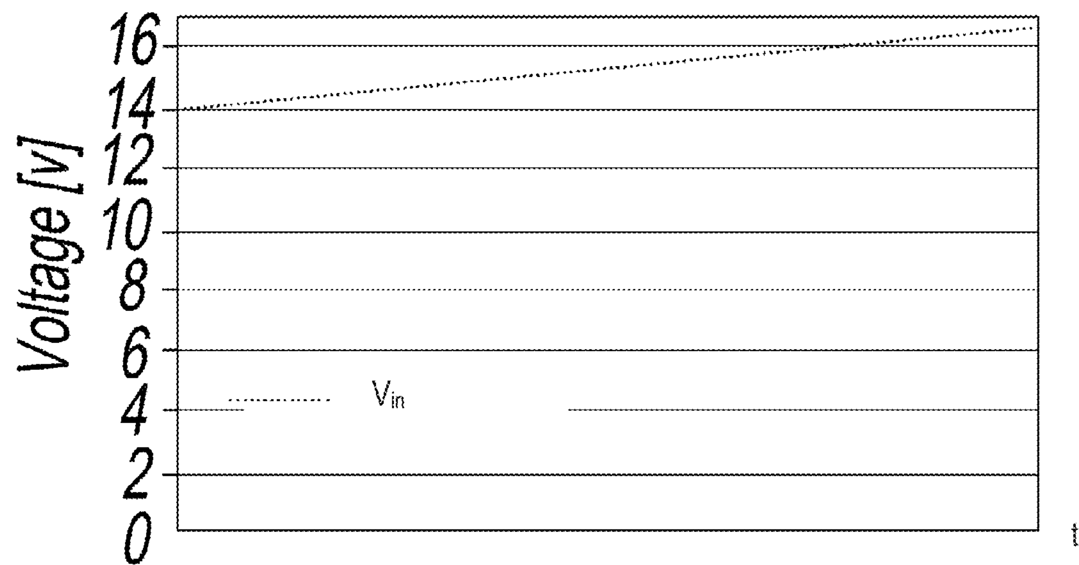
FIG. 7 is an exemplary illustration of charging operations for an integrated DC-DC power conversion and cell balancing circuit.
Figure 7:
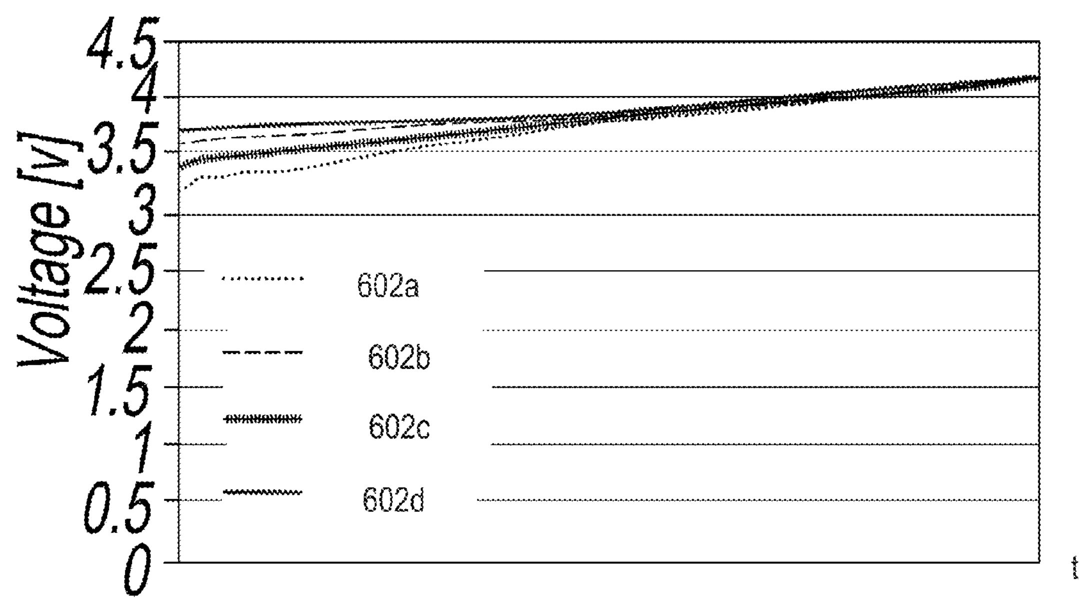

FIG. 7 is an exemplary illustration of charging operations for an integrated DC-DC power conversion and cell balancing circuit 600. According to one implementation, the switch 604 is closed during the balanced operations where power is transferred from the secondary side to the primary side of the DC-DC cell balancing converter 600. In one implementation, the battery cells 602*a*, 602*b*, 602*c*, and 602*d* have unequal initial open circuit voltages (OCVs) as described with respect to FIGS. 6B and 6C, and the total initial voltage ($V_{in}$) for the primary side of the DC-DC cell balancing converter 600 is 14 V. As power is transferred from the secondary side to the primary side of the DC-DC cell balancing converter 600, the balancing circuitry causes the battery cells 602*a*, 602*b*, 602*c*, and 602*d* to charge at rates based on the individual battery cell voltages. For example, battery cells having a higher voltage have a lower charge rate than battery cells having a lower voltage such that the individual battery voltages reach an approximately equal value during balanced cell balancing operations. For example, the final voltage for the battery cells 602*a*, 602*b*, 602*c*, and 602*d* after charging is approximately 4.1 V which equals a total of approximately 16.4 V after balanced charging operations.

Figure 8:
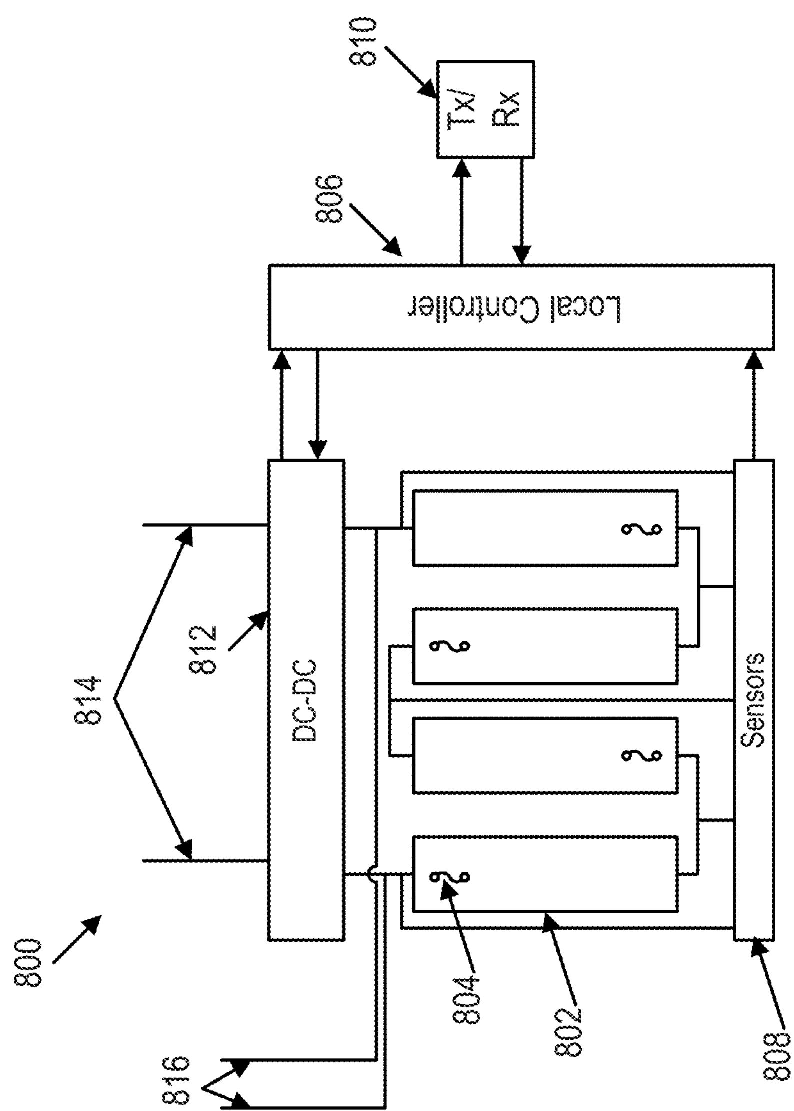
FIG. 8 is an exemplary illustration of an energy module.

FIG. 8 is an exemplary illustration of an energy module 800. The energy module 800 described by FIG. 8 is a battery module, but other types of energy modules can have a structure corresponding to the structure of the energy module 800. For example, solar energy modules, AC charging modules, fuel cell modules, and the like, are other types of energy modules that can be included in a modular energy management system. The energy module 800 includes at least one source cell 802, such as a battery cell, a modular DC-DC converter 812, a local controller 806 with a transceiver 810, and sensor devices 808.

The local controller 806 receives control signals from a central controller (not shown), determines a direction of power transfer for the energy module 800, and issues control signals to align the modular DC-DC converter 812 to achieve an output power that corresponds to the control signal from the central controller. The modular DC-DC converter 812 can be an isolated or a non-isolated DC-DC converter. In one implementation, the modular DC-DC converter can be the DC-DC cell balancing converter 500, or the DC-DC cell balancing converter 600.

The local controller 806 also receives sensor values from at least one sensor device 808 that can include temperature, voltage, current, SOC, and other indications related to the at least one source cell 802. The at least one sensor device can also determine if at least one fuse 804 within the at least one source cell 802 has received a trigger event to shut down the at least one source cell 802. For example, the at least one internal fuse 04 can be set to trip on overcurrent, high temperature, overload, and the like. In some implementations, the local controller 806 includes a memory to save information received from the central controller and the sensor values received from the at least one sensor device 808.

The local controller 806 communicates with the central controller via the transceiver 810. The transceiver 810 can include at least one transmitter and receiver antenna to receive signals from the central controller and transmit signals to the central controller. For example, the local controller 806 can transmit diagnostic information via the transceiver 810 to the central controller related to the energy module 800 and can receive information and control signals from the central controller 304. The central controller can also issue control signals to align the balancing circuitry for balanced or unbalanced operations. The transceiver 810 can also be implemented as separate transmitter and receiver devices according to some implementations.

The output signal 814 from the modular DC-DC converter 810 can be sent to an energy management bus along with the output of other power sources to maintain continuous power to the one or more electrical loads of an energy management system. In some implementations, a high voltage output signal 816 can be output from the energy module 800 upstream of the DC-DC converter 812 to provide power to the vehicle drive train. For example, the high voltage output signal 816 can be connected in series with high voltage output signals from other energy modules to provide power to the vehicle drive train components.

Figure 9:
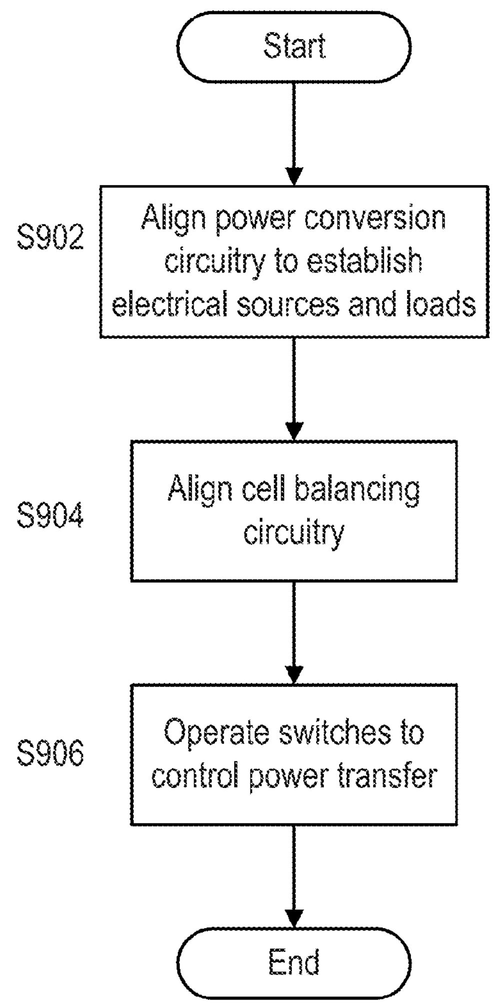
FIG. 9 is an exemplary flowchart of a cell balancing and power transfer process.

FIG. 9 is an exemplary flowchart of a cell balancing and power transfer process 900. The cell balancing and power transfer process 900 can be controlled the local controller 806 having circuitry configured to perform the cell balancing and power transfer process 900. Sensor devices 808 installed within one or more battery cells and other electrical components of an EV power transfer system can sense battery SOC, voltage, current, and the like. In some implementations, the actuators send control signals to control the duty cycle and switching frequency of the primary switch 106 and secondary switch 108, operating frequency, and direction of power transfer of the DC-DC cell balancing converter 600. The local controller 806 can also align the balancing circuitry for balanced or unbalanced operations by operating the switch 604 of the DC-DC cell balancing converter 600.

At step S902, control signals are sent to align at least one DC-DC cell balancing converter 600 based on a desired direction of power transfer. In some implementations, the battery cells 602*a*, 602*b*, 602*c*, 602*d*, and secondary DC power supply 112 can function as either power sources or electrical loads. For example, a battery cell in an electrical system of an EV can function as a power source to power electrical components of a vehicle, such as brakes, audio systems, and the like. The battery cell can also function as an electrical load during battery cell balancing among a plurality of battery cells. The control circuitry can send control signals to voltage sensors, current sensors, and timers as well as to the primary switch 106 and the secondary switch 108 to align the DC-DC cell balancing converter 600 for the desired direction of power transfer.

At step S904, the control circuitry can align the DC-DC cell balancing converter 600 for balanced or unbalanced operations. The DC-DC cell balancing converter 600 includes the switch 604 that can connect and disconnect the balancing circuitry from the DC-DC cell balancing converter 600 in response to a control signal issued from the control circuitry of the local controller 806. For example, the switch 604 can be closed during balanced operations and open during unbalanced operations. In some aspects, the control circuitry can issue a control circuitry to close the switch 604 to perform cell balancing operations when a difference between the voltages of the battery cells 602*a*, 602*b*, 602*c*, and 602*d* is greater than a predetermined threshold. In addition, when the difference between the voltages of the battery cells 602*a*, 602*b*, 602*c*, and 602*d* is less than a predetermined threshold, the control circuitry can issue a control signal to open the switch 604.

In addition, the control circuitry can issue the control signals to open and/or close the switch 604 based on an allowed maximum or minimum voltage for the battery cells 602*a*, 602*b*, 602*c*, and 602*d*. For example, achieving predetermined performance characteristics and operational lifetime of some types of battery cells, such as lithium-ion (Li-ion) battery cells, can be based on maintaining the battery cell voltage between the allowed minimum and maximum voltage values. If the battery cells 602*a*, 602*b*, 602*c*, and 602*d* are aligned for unbalanced operation when power is being transferred from the primary side to the secondary side of the DC-DC cell balancing converter 600, the battery cell with a lowest initial OCV may dip below the allowed minimum voltage even though the average battery cell voltage is greater than the allowed minimum voltage. Aligning the battery cells 602*a*, 602*b*, 602*c*, and 602*d* for balanced operation can assist in maintaining all of the battery cells between the allowed minimum and maximum voltages. If the control circuitry determines, based outputs from one or more voltage sensor devices, determines that the voltage of a cell is less than a lower threshold or greater than an upper threshold, a control signal can be issued to close the switch 604 to align the DC-DC cell balancing converter for balanced operations.

At step S906, the control circuitry issues control signals to operate the primary switch 106 and/or secondary switch 108 to control power transfer operations in the DC-DC cell balancing converter 600. If power is being transferred from the primary side to the secondary side of the DC-DC cell balancing converter 600, a control signal is sent to turn on the primary switch 106 when the current through the primary switch I106 is zero to implement ZCS. In implementations where power is transferred from the secondary side to the primary side of the DC-DC cell balancing converter 600, a control signal is sent to turn on the secondary switch 108 when the current though the secondary switch I108 is zero to implement ZCS. The control circuitry can receive sensor data relating to current at the primary switch 106 to determine when to send the control signal to turn on the primary switch 106. In an implementation, the control signal is sent to a gate driver circuit that turns on the primary switch 106. In some aspects, the gate driver circuits can be integrated into the primary switch 106 and the secondary switch 108. According to some implementations, the time at which the primary switch 106 is turned on can be the beginning of the active signal time for the duty cycle of the primary switch 106.

The amount of power transferred from the primary side to the secondary side of the DC-DC cell balancing converter 600 can be modified by changing the duty cycle of the primary switch 106. To increase the amount of power transferred from the primary side to the secondary side of the DC-DC cell balancing converter 600, the ratio of the active signal time for the primary switch 106 to the overall length of a period for the primary switch 106 is increased. To decrease the amount of power transferred from the primary side to the secondary side of the DC-DC cell balancing converter 600, the ratio of the active signal time for the primary switch 106 to the overall length of a period for the primary switch 106 is decreased. The quantity of power that is transferred from the primary side to the secondary side of the DC-DC cell balancing converter 600 can be determined based on the power and voltage characteristics of the electrical components in the electrical system.

A control signal can be sent to turn off the primary switch 106 to implement ZVS when the voltage at the primary switch 106 is zero, which can end the active signal time for the duty cycle of the primary switch 106. The control circuitry can receive sensor data relating to voltage at the primary switch 106 to determine when to send the control signal to turn off the primary switch 106.

During cell balancing operations when the switch 604 is closed, as power is transferred between the primary and secondary sides of the DC-DC cell balancing converter 600, the primary side of the balancing transformer 502 is activated by the alternating voltage at connection points 102*c* and 104*c* that occurs due to the charging and discharging of the capacitor pairs 102*a*/102*b* and 104*a*/104*b* during the power transfer operations. The balancing circuitry ensures that the discharge of energy from the battery cells 602*a*, 602*b*, 602*c*, and 602*d* is balanced so that the cell voltages and discharge rates remain approximately equal. As power is transferred from the secondary side to the primary side of the DC-DC cell balancing converter 600, such as during cell charging operations, the balancing circuitry allows for balanced charging of the battery cells 602*a*, 602*b*, 602*c*, and 602*d*.

Aspects of the disclosure are directed to an integrated DC-DC power conversion and cell balancing circuit that can perform bi-directional power transfer while maintaining balanced SOCs between battery cells of an energy module providing power to one or more electrical loads. Maintaining balanced SOCs between battery cells can improve performance and lifetime of the battery cells by ensuring that the one or more cells of the battery module remain above or below a maximum or minimum allowed voltage for the battery cells during charging and discharging operations. In addition, the integrated DC-DC power conversion and cell balancing circuit can be implemented in energy modules other than battery cell modules, such as solar cell modules, fuel cell modules, and the like.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 10:
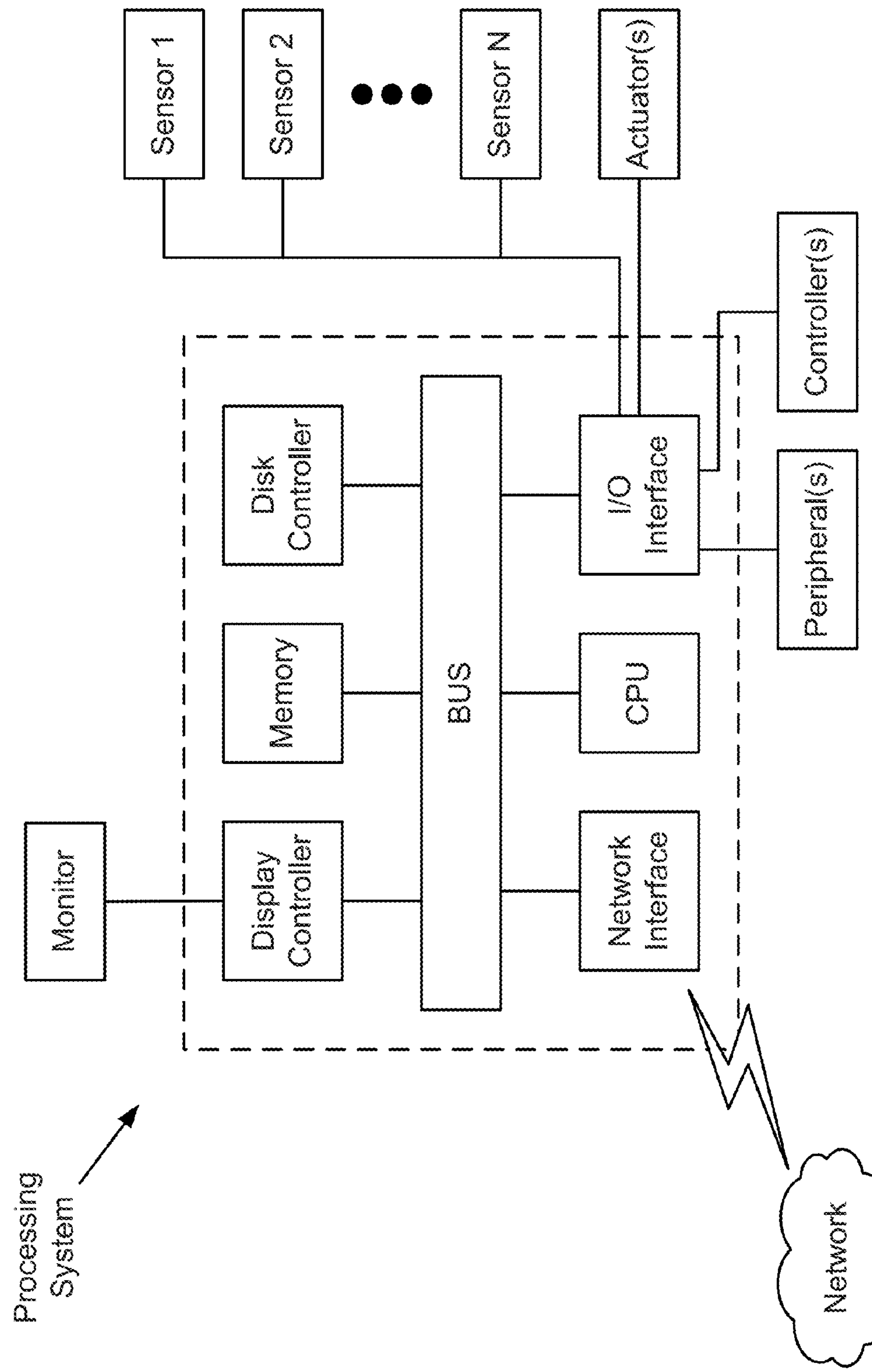
FIG. 10 schematically illustrates a processing system for a processing system, such as a controller and/or a computer system.

FIG. 10 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle. The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the modular energy management system. For example, the user can use the controller to select energy modules to provide power to one or more auxiliary electrical loads when the modular energy management system is in standby mode. The I/O interface can also provide an interface for outputting control signals to one or more actuators to control various actuated components, including DC-DC conversion circuitry, balancing circuitry, and other circuitry in the energy modules. In some implementations, the actuators send control signals to align the switch 604 to perform balanced or unbalanced charging and/or discharging operations.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between. The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices. Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system comprising:

DC-DC power conversion circuitry including a first switch and a second switch on either side of a first transformer with a first pair of capacitors and a second pair of capacitors cross-connected across the first transformer;

balancing circuitry including a primary side of a second transformer connected between the first pair of capacitors and the second pair of capacitors of the DC-DC power conversion circuitry; and control circuitry configured to:

determine a direction of power transfer through the DC-DC power conversion circuitry, align a primary side and a secondary side of the DC-DC power conversion circuitry based on the determined direction of power transfer, align the balancing circuitry to perform balanced or unbalanced operations, and control switching of the first switch and the second switch.

2. The system of claim 1, wherein the DC-DC power conversion circuitry is configured to perform bi-directional power transfer.

3. The system of claim 2, wherein the control circuitry is further configured to determine the direction of power transfer by selecting the first switch or the second switch to cycle on and off.

4. The system of claim 1, wherein a secondary side of the second transformer includes one or more taps connected to one or more source cells.

5. The system of claim 4, wherein the one or more source cells are connected to the one or more taps of the second transformer via a diode.

6. The system of claim 4, wherein the one or more source cells are battery cells.

7. The system of claim 4, wherein the balancing circuitry is configured to balance states of charge (SOCs) of the one or more source cells having unequal voltages.

8. The system of claim 1, wherein the second transformer is activated by an alternating voltage produced between the first pair of capacitors and the second pair of capacitors as power is transferred between the primary side and the secondary side of the DC-DC power conversion circuitry.

9. The system of claim 1, wherein the balancing circuitry includes a third switch connecting the balancing circuitry to the DC-DC power conversion circuitry.

10. The system of claim 9, wherein the control circuitry is further configured to align the balancing circuitry for balanced operations by issuing a control signal to close the third switch.

11. The system of claim 9, wherein the control circuitry is further configured to align the balancing circuitry for unbalanced operations by issuing a control signal to open the third switch.

12. The system of claim 1, wherein the control circuitry is further configured to align the balancing circuitry for balanced operations when a difference in voltage between one or more source cells is greater than a predetermined threshold.

13. The system of claim 1, wherein the control circuitry is further configured to align the balancing circuitry for balanced operations when a voltage of one or more source cells is at least one of less than a lower threshold or greater than an upper threshold.

14. The system of claim 1, wherein the balancing circuitry is further configured to perform cell balancing operations during charging and discharging of one or more source cells.

15. The system of claim 1, wherein the second transformer of the balancing circuitry has a higher excitation impedance than a total excitation impedance of the first transformer, the first capacitor pair, and the second capacitor pair of the DC-DC power conversion circuitry.

16. The system of claim 1, wherein the DC-DC power conversion circuitry has higher rates of energy transfer than the balancing circuitry.

17. The system of claim 1, wherein the balancing circuitry is configured to provide no interference to operations of the DC-DC power conversion circuitry.

18. A method comprising:

determining a direction of power transfer through DC-DC power conversion circuitry including a first switch and a second switch on either side of a first transformer with a first pair of capacitors and a second pair of capacitors cross-connected across the first transformer;

aligning a primary side and a secondary side of the DC-DC power conversion circuitry based on the determined direction of power transfer;

aligning balancing circuitry including a primary side of a second transformer connected between the first pair of capacitors and the second pair of capacitors of the DC-DC power conversion circuitry to perform balanced or unbalanced operations; and controlling switching of the first switch and the second switch.

19. A non-transitory computer-readable storage medium including executable instructions, which when executed by circuitry, causes the circuitry to perform the method according to claim 18.

20. A system comprising:

circuitry configured to determine a direction of power transfer through DC-DC power conversion circuitry including a first switch and a second switch on either side of a first transformer with a first pair of capacitors and a second pair of capacitors cross-connected across the first transformer, align a primary side and a secondary side of the DC-DC power conversion circuitry based on the determined direction of power transfer, align balancing circuitry including a primary side of a second transformer connected between the first pair of capacitors and the second pair of capacitors of the DC-DC power conversion circuitry to perform balanced or unbalanced operations, and control switching of the first switch and the second switch.

* * * * *